UNITED STATES PATENT OFFICE.

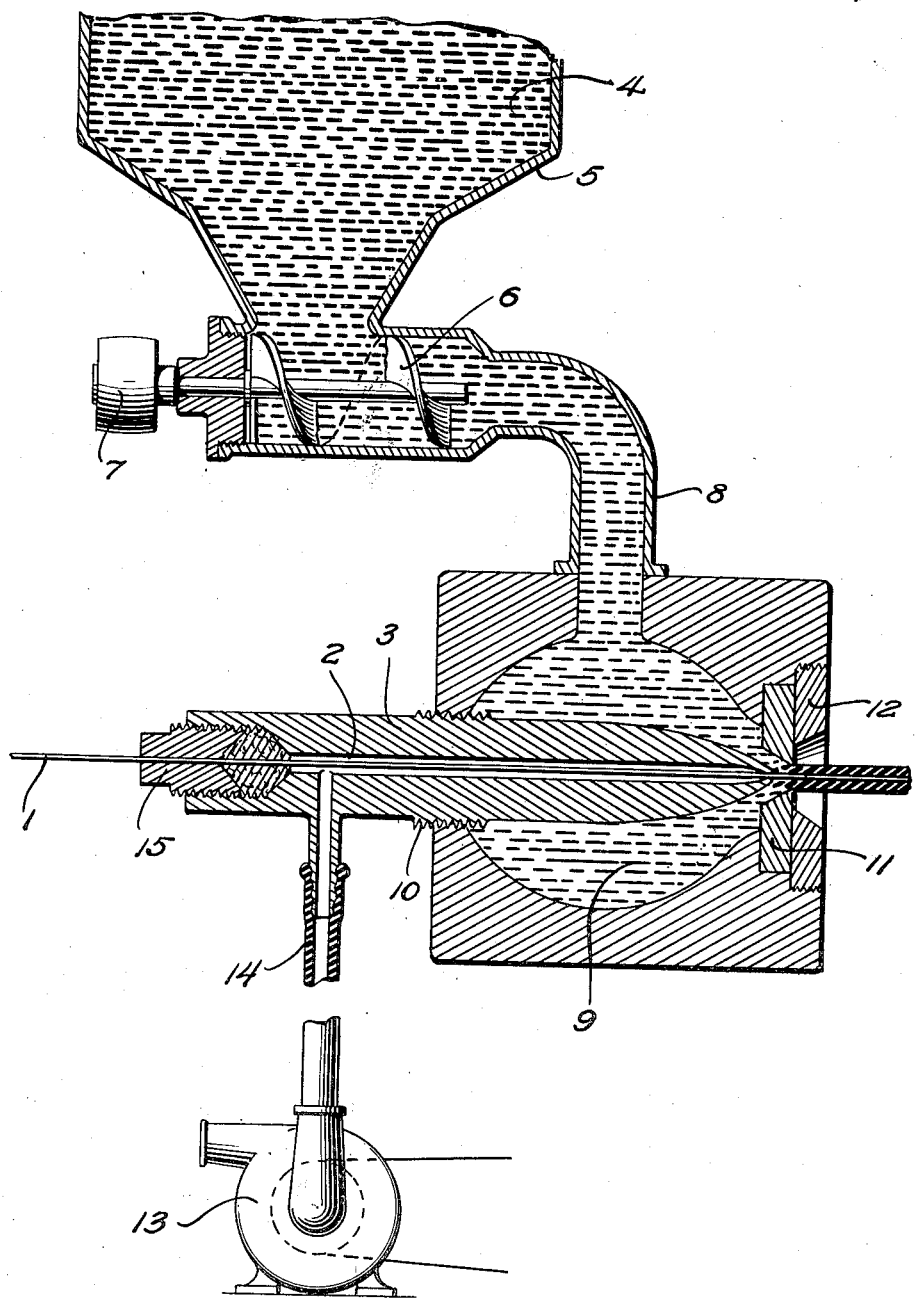

ROBERT R. WILLIAMS, OF ROSELLE, NEW JERSEY, ASSIGNOR TO WESTERN ELECTRIC COMPANY, INCORPORATED, OF NEW YORK, N. Y., A CORPORATION OF NEW YORK.

COVERING MACHINE.

1,419,090.  Specification of Letters Patent.  Patented June 6, 1922.

Application filed August 12, 1921. Serial No. 491,882.

*To all whom it may concern:*

Be it known that I, ROBERT R. WILLIAMS, a citizen of the United States, residing at Roselle, in the county of Union, State of New Jersey, have invented certain new and useful Improvements in Covering Machines, of which the following is a full, clear, concise, and exact description.

This invention relates to covering machines, and more particularly to machines for applying insulating material to electrical conductors.

It is an object of the invention to provide means whereby a covering material extruded upon a core will be made to adhere tightly thereto.

In the standard method of applying a covering material to a wire, the wire is drawn through a guide which is adapted to hold it in the proper position to receive a layer of insulation, or of outer armor, as in the case of lead covered cables. As the wire progresses through the guide, the covering material is fed forward with sufficient pressure to force it through a die in such a manner as to completely surround the wire. In this method of covering, however, it is extremely difficult to correctly position the wire guide with respect to the die through which the wire passes after receiving the covering material, for if the guide is set too far back, the wire may easily be forced out of its central position in the mass of covering material; while, on the other hand, if the guide is too close to the opening, the material is forced out in a thin-walled tube of excessively large internal diameter, leaving the core loose inside. Particularly, in covering a conductor with rubber, gutta percha, ozokerite and other plastic insulating materials, it has been found very difficult to obtain a tight bond between the wire and the insulation and at the same time keep the wire centralized, and it has proven practically impossible to successfully apply thin-walled insulations to conductors.

In its preferred form, the invention contemplates leading a wire through a guide adjustably mounted in a suitable chamber. A mass of rubber dough is forced into the chamber and around the wire and thence through a suitable opening, the walls of which shape the exterior surface of the insulating layer. By means of a series of interchangeable parts, adjustments may be made in the size of the guide channel and the die, whereby the thickness of the insulating covering may be controlled. The channel in the guide through which the wire passes is adapted to be evacuated by means of a vacuum pump operated continuously during the passage of the wire so that the rubber dough will be collapsed firmly against the wire at the tip of the guide. The admittance of air at the back end of the channel is prevented by a packing gland through which the wire passes on entering the guide member.

Other objects and features of the invention will appear from a consideration of the following description taken in connection with the accompanying drawing and the appended claims.

The drawing shows a sectional view of the covering mechanism in diagrammatic form.

Referring to the drawing, the wire 1 is led through the channel 2 of the wire-guide member 3. The mass of rubber dough 4 is fed through the hopper 5 to any suitable conveyor, such as the worm gear 6. The worm gear 6, driven by any suitable source of power which may be belt-geared to the pulley 7, is adapted to force the rubber dough through the passage 8 to the chamber 9. The wire guide 3 is adjustably mounted in the chamber 9, as at 10, so that the tip of the guide may be set back some distance from the opening in the block 11, where the wire emerges from the chamber, or may even protrude through it. The plate member 12 is removable to permit a substitution for the die 11 of a die having a larger or smaller opening, as desired. In operation, these adjustments are important, for if the guide is set too far back, the wire may be readily forced out of its central position with respect to the die 11; while, if the guide is too close to the die, the rubber is forced out in a thin-walled tube of an excessively large internal diameter, leaving the wire loose inside. In order to effectively overcome these difficulties, the channel 2 is evacuated continuously during the passage of the wire by means of the vacuum pump 13 connected to the guide member 3 by means of the detachable tubing 14. The mass of rubber dough in the chamber 9 is forced about the guide member 3 and about the wire 1 adjacent the die 11. The channel 2 of the guide member 3 being evacuated, the dough will be collapsed firmly against the wire at the tip of the guide. The admittance of air at the back end of the channel 2 is prevented by the packing gland 15 through which the wire passes. It will be evident that the continuous evacuation of the channel through which the wire passes permits the operation of the machine with the wire guide set up close to the opening, thus minimizing any possibility of decentralization. The wire may be propelled through the covering mechanism either by the force of the flow of rubber or by any suitable means such as a take-up capstan of the usual type.

Although the invention has been described in its preferred application to insulating machines, it is likewise applicable to other devices such as, for example, lead presses for lead-covered cables, and it is, therefore, not intended to limit the invention except as defined by the scope of the appended claims.

What is claimed is:

1. In a covering machine, a channel adapted to receive the article to be covered, means for applying a covering material at the extremity of the channel, and means for evacuating said channel whereby said material will be collapsed firmly against said article.

2. In a covering machine, a channel adapted to receive the article to be covered, means for moving said article through said channel, means for applying a covering material upon said article at the extremity of said channel, and means for evacuating said channel whereby said material will be collapsed firmly against said wire.

3. In a covering machine, a guide for the article to be covered, a channel in said guide, means for moving said article through said channel, means for applying a covering material to said article at the tip of said guide, and means for evacuating said channel whereby said material will be collapsed firmly against said article.

4. In a covering machine, a wire guide, a channel in said guide, means for moving wire through said channel, means for serving insulating material to the wire at the tip of said guide, and means for evacuating said channel continuously during the passage of said wire whereby said insulating material will be collapsed firmly against said wire.

5. In a wire-insulating machine, a chamber adapted to hold an insulating material, a die disposed in said chamber, a wire guide adjustably mounted in said chamber opposite said die, a channel disposed in said guide, means for moving wire through said channel and said die, means for serving insulating material to said chamber, and means for evacuating said channel continuously during the passage of said wire whereby said insulating material will be collapsed firmly against said wire between said die and said guide.

6. The herein described method of covering, which comprises moving an article through an evacuated channel, and applying a covering material to said article at the extremity of said channel.

7. The method of insulating electrical conductors which comprises moving a conductor through a continuously evacuated channel, and applying an insulating material to said conductor at the point where it emerges from said channel whereby said material will be collapsed firmly against said conductor.

In witness whereof I hereunto subscribe my name this 10th day of August, A. D., 1921.

ROBERT R. WILLIAMS.